Patented Dec. 16, 1930

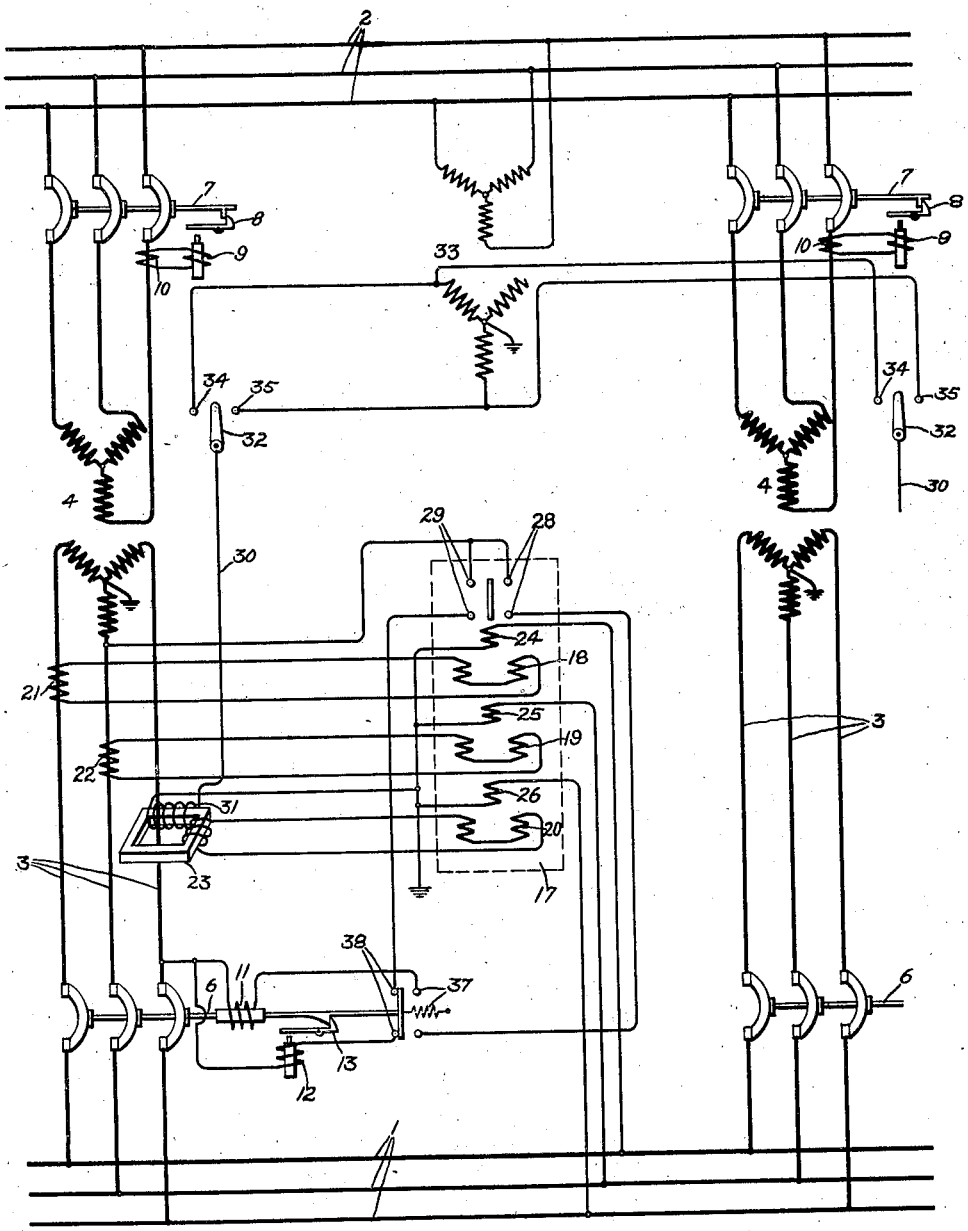

1,785,714

UNITED STATES PATENT OFFICE

WILLARD J. McLACHLAN, OF SCHENECTADY, NEW YORK, ASSIGNOR TO GENERAL ELECTRIC COMPANY, A CORPORATION OF NEW YORK

CONTROL SYSTEM

Application filed November 23, 1929. Serial No. 409,389.

My invention relates to control systems for circuit breakers and particularly to a control system for controlling the operation of a circuit breaker in a feeder supplying current to an alternating current network.

Where low voltage alternating current networks are used, it is the practice to supply electric energy to the network at different points by means of step-down transformers the primaries of which are connected, by high voltage feeders, to a main generating station or other suitable source of current.

One object of my invention is to provide an improved arrangement for remotely controlling the connection and disconnection of the secondary of such a network transformer to and from the network and for disconnecting the transformer from the network in response to a fault on the feeder or the transformer. More specifically, an object of my invention is to provide an improved control arrangement of the type disclosed and claimed in the copending application Serial No. 404,148, filed November 1, 1929 by D. K. Blake and assigned to the same assignee as this application.

My invention will be better understood from the following description when taken in connection with the accompanying drawing, the single figure of which is a diagram of a control system embodying my invention, and its scope will be pointed out in the appended claims.

Referring to the drawing, 1 represents a polyphase network which is arranged to be supplied with electric energy from a suitable polyphase supply circuit 2 by means of a plurality of polyphase feeders 3, two of which are shown in the drawing. While I have shown my invention in connection with polyphase circuits, it is obvious that my invention is equally applicable to circuits having any number of phases.

Each feeder 3 comprises a polyphase step-down transformer 4, the low voltage secondary of which is arranged to be connected to the network 1 by means of a suitable switch 6, and the high voltage primary of which is arranged to be connected to the supply circuit 2 by means of a suitable switch 7. The transformer 4 and the secondary switches 6 are usually located near the network 1 whereas the primary switches 7 are usually in the main station or substation containing the supply source 2.

The switches 7, which may be of any suitable type, examples of which are well known in the art, are usually arranged so that they may be opened and closed at the will of an operator and are also preferably arranged so that they are opened automatically in response to overload conditions on the respective feeders. As shown in the drawing, each switch 7 is an overload circuit breaker of the well known latched-in type which is adapted to be closed manually and which is opened by releasing a latch 8 either manually or automatically by means of an overload coil 9 connected in series relation with the respective feeder 3 by means of current transformer 10.

The switches 6 may also be of any suitable type, examples of which are well known in the art. As shown in the drawing each switch 6 is a latched-in circuit breaker and comprises a closing coil 11 which when energized closes the circuit breaker and a trip coil 12 which when energized releases a latch that holds the circuit breaker in its closed position.

In order to effect the immediate opening of a secondary circuit breaker 6 when a fault occurs on its associated feeder or transformer so that a large reversal of energy occurs through the circuit breaker 6, I provide a suitable polyphase reverse power relay 17 which is connected in the transformer secondary circuit so as to be energized in response to the direction of power flow therein. In order to simplify the drawing, only one of the feeders 3 is shown with its associated reverse power relay 17. As shown in the drawing, the polyphase relay 17 has three current coils 18, 19 and 20 which are respectively connected in series relation with different phases of the network transformer secondary by means of the current transformers 21, 22 and 23. The polyphase relay 17 is also provided with the voltage windings 24, 25 and 26 which are respectively connected across different phases of the network 1. These relay windings are arranged in any suitable manner, examples of which are well known in the art, so that a resultant torque is produced in a direction to cause the relay 17 to close its contacts 28 when current flows from the associated feeder 3 to the network 1 and in a direction to cause the relay 17 to close its contacts 29 when a predetermined amount of power flows from the network 1 to the associated feeder 3. The closing of the contacts 29 connects the trip coil 12 of the associated circuit breaker 6 across one phase of the network transformer secondary so as to effect the opening of the circuit breaker. Therefore, in case of a fault on a feeder or transformer the associated secondary circuit breaker 6 is opened to effect the disconnection of the faulty feeder or transformer from the network.

Preferably each reverse power relay 17 is set so that it closes its respective contacts 29 only in response to a relatively large reversal of energy in its respective feeder. Such a high setting of the relay 17 has the advantage that reversals of energy in a feeder which are not sufficient to effect the opening of the overload circuit breaker 7 therein do not effect the opening of the circuit breaker 6 under conditions which would cause the circuit breaker to be reclosed immediately after it is opened. In this manner the operation of the circuit breaker, well known in the art as pumping, is prevented.

In order that the operation of a circuit breaker 6 may also be controlled from a remote point independently of the direction of power flow through the associated feeder, I provide an improved arrangement for using the reverse power relays 17 as control relays to control the opening and closing of the respective secondary circuit breakers 6. In accordance with my invention, each feeder has associated therewith a pilot wire 30 one end of which is connected to a tertiary winding 31 on one of the current transformers supplying current to one of the current windings of the power directional relay 17. As shown in the drawing, the current transformer 23 is provided with the tertiary winding 31 but it is obvious that this windng 31 may be mounted on the cores of any of the current transformers. For controlling the energization of the pilot wire circuit 30 so as selectively to control the operation of the relay 17 from a remote point independently of the direction of power flow in the associated feeder 3 I provide at the remote point a suitable two-position switch 32 associated with each pilot wire circuit for connecting the pilot wire circuit to a suitable voltage source so that voltages having different phases may be impressed across the pilot wire circuit to vary the phase relation between the current in the current winding 20 and its associated potential winding 26 of the relay 17. As shown in the drawing, the voltages of the proper phases to operate the relay 17 selectively are obtained from an auxiliary polyphase transformer 33, at the main station. The secondary windings of the transformer 33 are connected in star and two of the secondary terminals of transformer 33 are respectively connected to the contacts 34 and 35 of the two-position control switch 31 while the neutral is connected to ground which constitutes the other side of the pilot wire circuit 30. The circuit of the tertiary winding 31 is so arranged that when the switch 32 is in engagement with its contact 34, sufficient current of the proper phase flows through the tertiary winding 31 to cause the current in the winding 20 to produce sufficient torque to close the closing contacts 28 of the relay 17 and when the switch 32 is in engagement with its contacts 35 sufficient current of the proper phase flows through the tertiary winding 31 to cause the current in the winding 20 to produce sufficient torque in a direction to close the tripping contacts 29 of the relay 17.

Preferably the relay 17 is biased, in any suitable manner, to a position in which both of its contacts are open when it is deenergized.

The operation of the arrangement shown is as follows:

Whenever it is desired to place a feeder in service the primary switch 7 therein is first closed and then the associated control switch 32 is moved so that it engages its contacts 34. The tertiary winding 31 of the associated current transformer 23 is then energized by current of the proper phase to cause the relay 17 to close its contacts 28 and complete the energizing circuit of the associated network breaker 6. This energizing circuit also includes the auxiliary contacts 37 on the circuit breaker 6 so that the energizing circuit does not remain closed after the circuit breaker closes. The circuit breaker is held in its closed position by its latch 13.

When it is desired to remove a feeder from service the associated control switch 32 is moved into engagement with its contact 35. This may be done either before, simultaneously with or after the associated primary switch 7 is opened, but preferably after, so that the reverse magnetizing current for the transformer 4 aids in producing a torque in a direction to close the contacts 29 of the relay 17. The current through the pilot wire circuit 30 and the tertiary winding 31 of the transformer 23 causes sufficient current of the proper phase to flow through the current winding of the relay 17 to cause the relay to close its contacts 29 and thereby complete an energizing circuit for the trip coil 12 of the associated network switch 6. This energizing circuit also includes the auxiliary contacts 38 on the associated network switch 6.

In case of a fault on a feeder or its associated transformer, the excessive reverse power which flows from the network 1 to the fault produces sufficient torque in the relay 17 to cause the relay to close its tripping contacts 29 to effect the opening of the associated network breaker 6.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States is:

1. In combination, two electric circuits, a circuit breaker for connecting said circuits together, means for effecting the opening of said circuit breaker in response to the flow of power between said circuits in a predetermined direction including a current transformer having its primary winding connected in series with said circuits when said circuit breaker is closed and a power directional relay having a voltage winding connected to one of said circuits and a current winding connected to the secondary winding of said current transformer, and means for remotely controlling the opening and closing of said circuit breaker including a tertiary winding of said current transformer and means for impressing upon said tertiary winding voltages having different phase relations with respect to the phase of the voltage impressed upon said voltage winding of said relay.

2. In combination, an alternating current circuit, a network, a circuit breaker for connecting said circuit to said network, means for effecting the opening of said circuit breaker in response to the flow of power from said network to said circuit including a current transformer having a primary winding, connected in series with said circuit and network when said circuit breaker is closed, and a secondary and a tertiary winding, and a power directional relay having a voltage winding and a current winding connected to the secondary winding of said current transformer, means for energizing said voltage winding and means for remotely controlling the opening and closing of said circuit breaker including means for impressing upon said tertiary winding of said current transformer voltages having different phase relations with respect to the phase of the voltage impressed upon said voltage winding of said relay.

3. In combination, a supply circuit, a network, a power transformer, means for connecting the primary of said power transformer to said supply circuit, a circuit breaker for connecting the secondary of said power transformer to said network, means for effecting the opening of said circuit breaker in response to the flow of power from said network to said transformer including a current transformer having a primary winding connected in series between the secondary of said power transformer and said network when said circuit breaker is closed and a secondary and a tertiary winding, and a power directional relay including a voltage winding connected to said network and a current winding connected to the secondary winding of said current transformer, and means for remotely controlling the opening and closing of said circuit breaker including means for impressing upon said tertiary winding of said current transformer voltages of different phases relative to the phase of the voltage impressed upon the voltage winding of said relay.

4. In combination, a supply circuit, a network, a power transformer, means for connecting the primary of said power transformer to said supply circuit, a circuit breaker for connecting the secondary of said power transformer to said network, means for effecting the opening of said circuit breaker in response to the flow of power from said network to said transformer including a current transformer having a primary winding connected in series between the secondary of said power transformer and said network when said circuit breaker is closed and a secondary and a tertiary winding, and a power directional relay including a voltage winding connected to said network and a current winding connected to the secondary winding of said current transformer, and means for remotely controlling the opening and closing of said circuit breaker including a source of polyphase voltage and means for connecting said tertiary winding of said current transformer to different phases of said source.

In witness whereof, I have hereunto set my hand this 22nd day of November, 1929.

WILLARD J. McLACHLAN.